United States Patent [19]

Macpherson

[11] Patent Number: 4,958,533
[45] Date of Patent: Sep. 25, 1990

[54] VARIABLE POSITIVE DRIVE TRANSMISSION

[76] Inventor: Roger Macpherson, 185 Pleasant Way, Penfield, N.Y. 14526

[21] Appl. No.: 357,407

[22] Filed: May 26, 1989

[51] Int. Cl.$^5$ .............................................. F16H 3/10
[52] U.S. Cl. .................................. 74/333; 74/336 R; 192/44
[58] Field of Search .............. 74/333, 336 R; 192/44, 192/48.7, 48.9, 47

[56] References Cited

U.S. PATENT DOCUMENTS

| | | | |
|---|---|---|---|
| 1,950,110 | 3/1934 | Hartsock | 74/333 |
| 2,350,627 | 6/1944 | Malachowski | 192/44 X |
| 2,377,575 | 6/1945 | Ringer | 192/44 X |
| 2,453,794 | 11/1948 | Iavelli | 74/333 |
| 2,641,936 | 6/1953 | Walder | 74/336 X |
| 3,889,547 | 6/1975 | Sun et al. | 74/336 |
| 4,817,451 | 4/1989 | Weismann | 74/333 |

FOREIGN PATENT DOCUMENTS

1237824 4/1986 U.S.S.R. ........................ 74/336 R

*Primary Examiner*—Dwight Diehl
*Attorney, Agent, or Firm*—Eugene Stephens & Associates

[57] ABSTRACT

A variable speed transmission includes parallel drive and driven shafts which mount respective series of intermeshing gears of progressively increasing gear ratio for selectively transmitting power from one shaft to the other. A series of two-way roller clutches are interposed between the driven shaft and respective gear members of the series of driven gears. The roller clutches are engageable for rotatively coupling the respective gear members to the driven shaft and are disengageable for permitting relative rotation between the respective gear members and the driven shaft. Each of the roller clutches includes a cam disk having a plurality of recesses formed in its peripheral surface and a roller retainer circumferentially supporting a plurality of rollers within respective recesses in the cam disk. A hydraulically controlled actuator is connected to each of the retainers for indexing the roller retainers together with the plurality of rollers between respective limit positions within the recesses. The actuating device includes an annular plate rotatively coupled to the roller retainer and angularly spaced vanes in communication with a pair of fluid supply ducts of a stationary hydraulic control housing. One of the supply ducts provides for indexing the roller retainer to one of the limit positions, and the other of the supply ducts provides for indexing the roller retainer to the other limit position.

10 Claims, 3 Drawing Sheets

VARIABLE POSITIVE DRIVE TRANSMISSION

BACKGROUND OF THE INVENTION

This invention relates to transmissions, and more particularly to an improved automotive transmission of the type which combines the features of a positive gear drive, and a transmission which can be shifted automatically in response to variations in the speed of a vehicle's drive shaft. Even more particularly this invention relates to an improved two-way roller clutch mechanism for use in transmissions of the type described.

Most automotive transmissions normally comprise either the stick shift or manually operated variety, which relies on the manual shifting gears for transmitting drive from the vehicle drive shaft to the wheels of the vehicle, or the so-called automatic transmission, which frequently employs hydraulically or centrifugally actuated clutch mechanisms which respond to variations in the speed of the drive shaft.

The present invention combines features of both of the above-noted drive systems. For example, the transmission disclosed herein utilizes two series of intermeshed gears for transmitting drive to a driven shaft, but the two series always remain engaged or intermeshed with each other, rather than being shifted into and out of engagement with each other as in the case of conventional stick shifts. Furthermore the gears on the driven shaft are selectively coupled thereto by novel two-way roller clutch mechanisms, which can be selectively and hydraulically operated by, for example, a micro-computer, or the like. The computer can be made selectively and successively to actuate or deactuate the clutch mechanism in response to changes in the speed of the drive shaft, thereby to make the most efficient use of the fossil fuel that is used to operate the associated power supply - e.g. an IC engine.

As disclosed in U.S. Pat. Nos. 3,820,406 and 3,294,208, so-called one-way roller clutches, which function to lock or prevent rotation in one direction, and to allow friction-free or free wheeling rotation in the opposite direction, have been employed heretofore in connection with drives for starters for IC engines, and for grinding wheels. Various uses for two-way roller clutches are taught by U.S. Pat. Nos. 3,750,782; 2,028,876; 3,907,083; and 4,076,108. Although the last of these patents suggests the use of a two-way roller clutch in an automotive transmission, the drive illustrated in the patent has nothing to do with a transmission of the type in which two sets of gears are constantly intermeshed.

It is an object of this invention, therefore, to provide an improved positive drive transmission which can be controlled automatically to shift from one gear sequence to another in response to changes in engine speeds.

Still another object of this invention is to provide, for a transmission of the type described, an improved two-way roller clutch mechanism for selectively coupling a plurality of different gears one by one to an associated driven shaft.

Other objects of the invention will be apparent hereinafter from the specification and from the recital of the appended claims, particularly when read in conjunction with the accompanying drawings.

SUMMARY OF THE INVENTION

Fixed to the drive shaft of a vehicle are numerous ring gears having progressively larger pitch diameters. Each of these driving gears meshes constantly with one of a like number of driven gears mounted each by a separate two-way roller clutch mechanism on a driven shaft mounted parallel to the drive shaft. The driven gears also have progressively greater pitch diameters, but are arranged in inverse order on the driven shaft so that the largest of the driven gears is intermeshed with the smallest of the drive gears, and vice versa. Accordingly, the intermeshing drive and driven gears define respective gear pairs of progressively varying gear ratio. The driven shaft is connected in any conventional manner to the wheels of the vehicle.

Each clutch mechanism includes a disc cam fixed to the driven shaft, an annular roller retainer surrounding the disc cam, and a ring gear (one of the driven gears) surrounding the roller retainer. The retainer supports between the outer periphery of the disc cam and the inner periphery of the surrounding ring gear, a plurality of rollers or cam followers, which are caused to be shifted into one of two different limit positions in one of which rotation of the associated gear is imparted to the driven shaft, and in the other of which the gear is allowed to rotate freely on the driven shaft. Each retainer has one or more series of angularly spaced vanes formed on its outer peripheral surface in communication with a computer-controlled supply of hydraulic fluid under pressure. The hydraulic fluid may be utilized selectively to index a respective retainer slightly clockwise or counterclockwise relative to its associated disc cam, thereby to shifting the cam rollers into one or the other of their above-noted limit positions.

THE DRAWINGS

Figure 1:
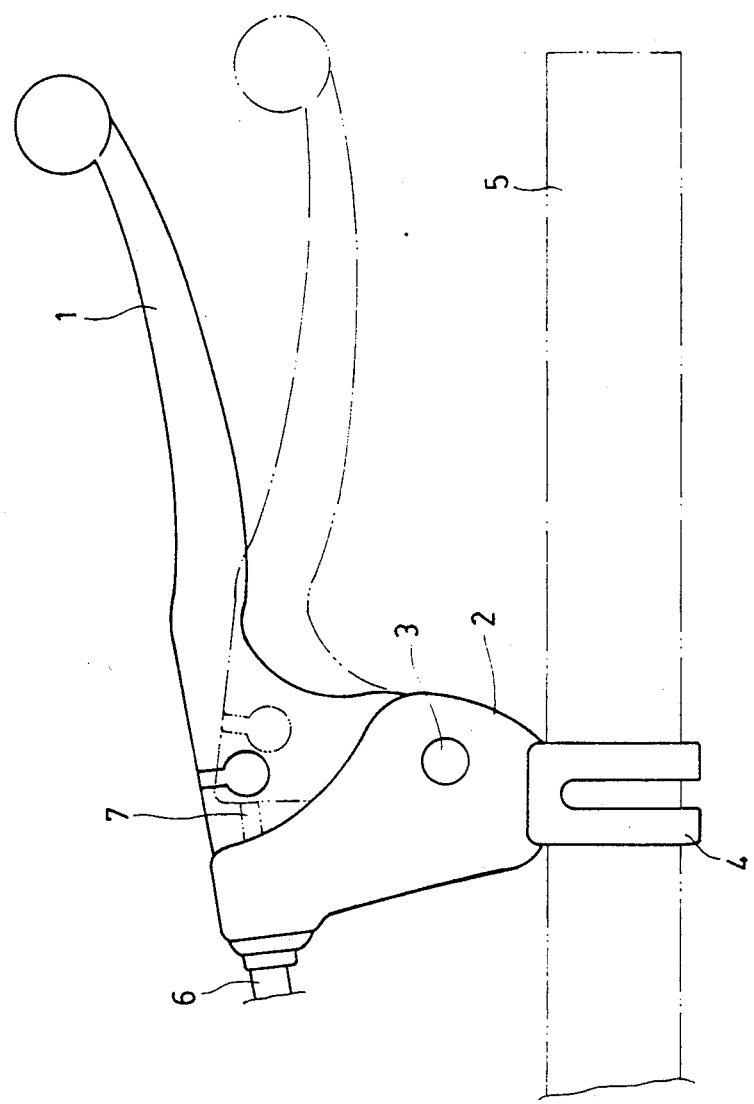
FIG. 1 is an exploded perspective view of the principal parts of an improved two-way roller clutch mechanism made according to one embodiment of this invention.
Figure 2:
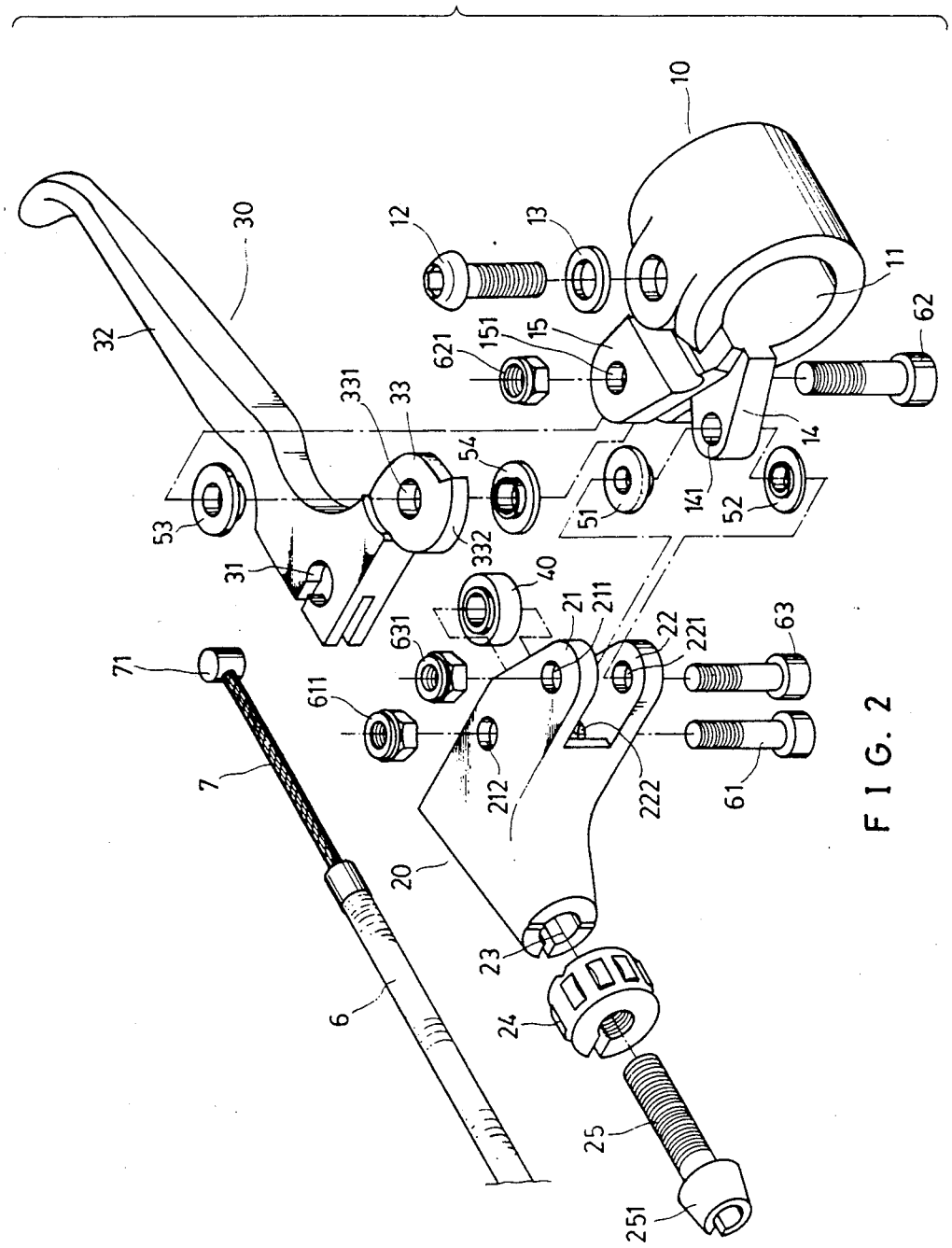
FIG. 2 is an end view of the parts shown in FIG. 1 as they appear when assembled, but with portions thereof broken away and shown in section, and with the rollers or cam followers shown in one of their two limit positions.
Figure 3:
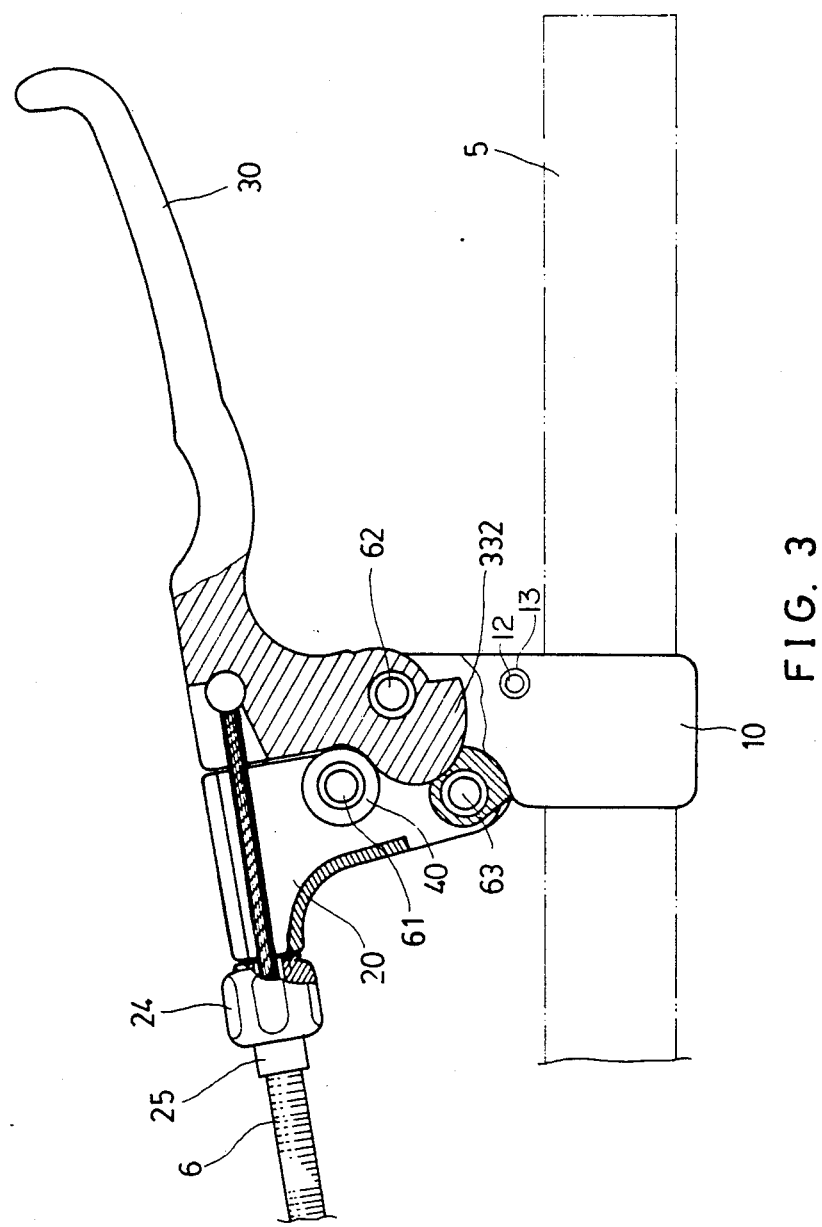
FIG. 3 is a view similar to FIG. 2 but showing the cam followers in the other of their two limit positions.
Figure 4:
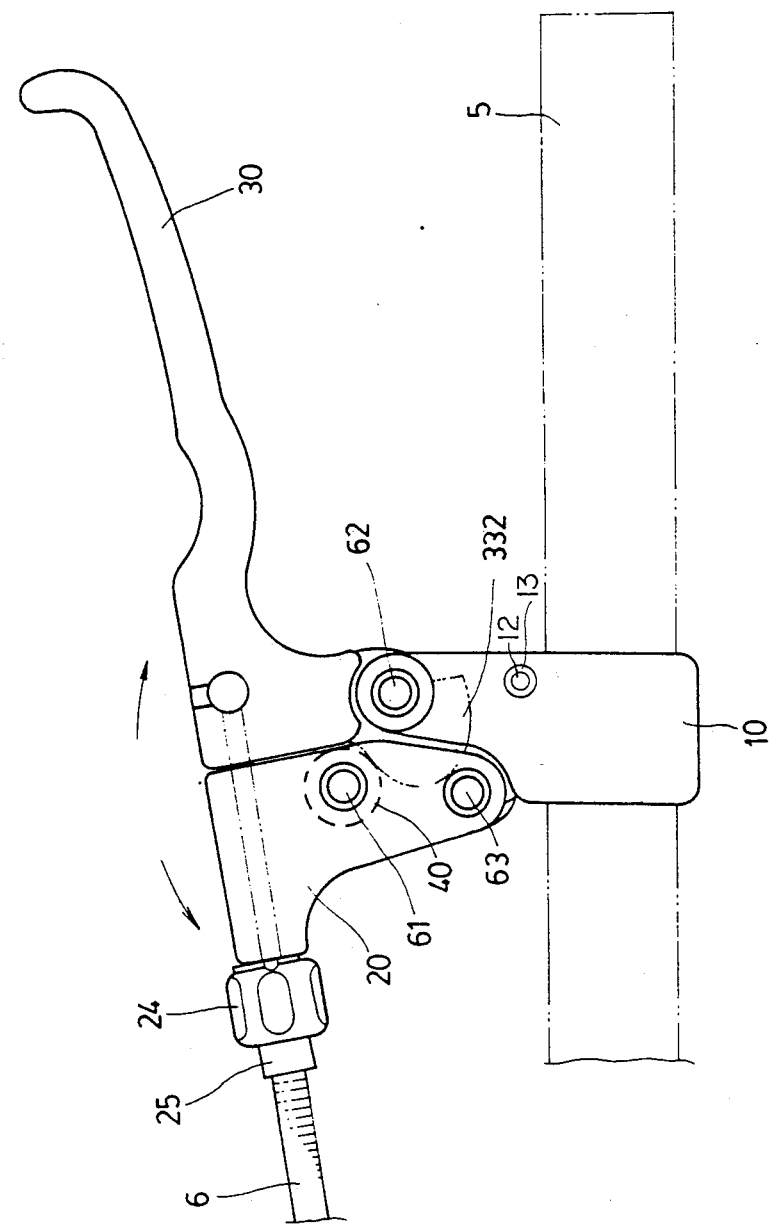
Figure 5:
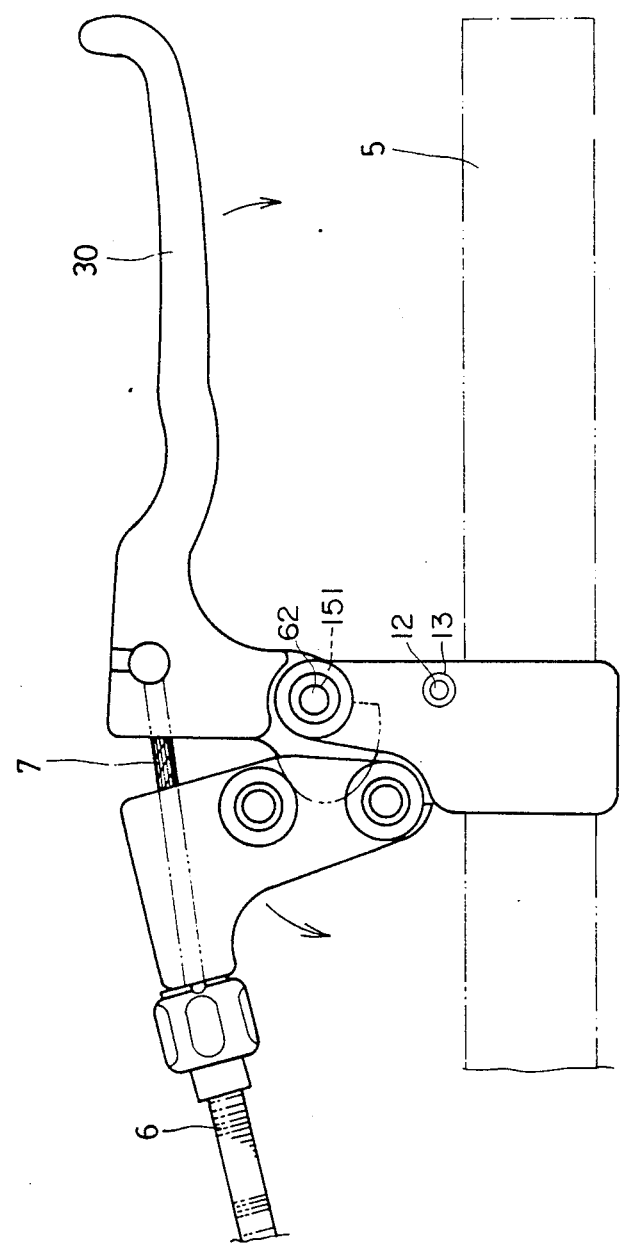

FIG. 4 is a fragmentary plan view of a transmission made according to one embodiment of this invention, and incorporating therein two-way roller clutch mechanisms of the type shown in FIGS. 1-3; and FIG. 5 is a fragmentary sectional view taken generally along line 5—5 in FIG. 4 looking in the direction of the arrows, and illustrating diagramatically one manner in which the clutch mechanisms may be hydraulically operated.

DETAILED DESCRIPTION OF THE PREFERRED EMBODIMENTS

Referring now to the drawings by numerals of reference, and first to FIG. 1, a two-way roller clutch of the type which is particularly suitable for use with this invention comprises three basic parts: a disc cam 10, a roller retainer 11, and a ring gear 12, respectively. The cam 10, which is adapted to be secured coaxially on a shaft 14 for rotation therewith, has formed on its outer peripheral surface a plurality of equi-angularly spaced cam lobes 15, which are separated by equi-angularly spaced dwells or recesses 16 that are formed in the outer periphery of cam 10 to extend coaxially thereof. Also, disc cam 10 has projecting axially from each of its opposed, plane end surfaces a plurality (three in the embodiment illustrated) of small, cylindrically shaped limit pins 18, the purpose of which will be described hereinafter.

As noted hereinafter, cam 10 is disposed to be mounted to rotate coaxially within a roll retainer 11, which comprises a pair of similarly shaped, annular plates 21 and 22 that are fixed in axially spaced, coaxial relation to each other by a plurality of integral, angularly spaced arcuate web sections 23. Sections 23 extend axially between and interconnect the annular plate portions 21 and 22 of the retainer. Each of the radial spaces or openings 24 that are formed in the retainer 11 between its adjacent web sections 23 (see FIGS. 2 and 3) contains a pair of spaced compression springs 25, and a cylindrically shaped roll or cam follower 26. Each roll or roller 26 extends parallel to the axis of plates 21 and 22, and is resiliently supported at diametrally opposite sides thereof between the confronting ends of the associated two compression springs 25 for limited angular movement in its opening 24 about the axis of plates 21 and 22.

As shown more clearly in FIGS. 2 and 3, the arcuate web sections 23, which interconnect plates 21 and 22, are radially spaced from both the inner and outer peripheral surfaces of plates 21 and 22, thus forming in retainer 11 inner and outer annular recesses 27 and 28 (FIG. 1) for housing the cam 10 and gear 12, respectively, as noted hereinafter. Each of the plates 21 and 22 has formed therein radially inwardly of its web sections 23 a plurality (three in the embodiment illustrated) of arcuate slots 29, only three of which (those in plate 21) are shown in FIG. 1. Although the slots 29 in plate 22 are not illustrated, it is to be understood that they are similar in configuration to the slots 29 shown in FIGS. 1–3. These slots have a width only slightly greater than the diameter of the pins 18 on the disc cam 10, so that they can accommodate these pins as noted hereinafter.

Moreover, each of the plates 21 and 22 has formed in its outer peripheral surface a plurality of axially spaced, radial slots or recesses 31, which divide the outer peripheral surface of each plate 21 and 22 into a plurality of radially projecting, axially spaced vanes 32, which, as noted hereinafter, are disposed in communication with a hydraulic system which operates selectively to rotatably index the retainer 11 in one direction or the other about its axis.

The ring gear 12 has an axial length slightly less than the axial space separating the plates 21 and 22, and an inner diameter, only slightly greater than the outer diameter of the web sections 23 of the retainer, so that the gear 12 can be mounted in recess 28 for rotation between plates 21 and 22, as noted hereinafter.

When the parts 10, 11 and 12 are assembled as shown in FIGS. 2 and 3 for the purpose of producing a two-way roller clutch, the disc cam 10 is mounted coaxially in recess 27 between the plates 21 and 22, and with its outer, cammed or lobed peripheral surface engaged with the rollers 26. Also, the gear 12 is rotatably mounted coaxially between the plates 21 and 22 in the recess 28 around the outside of the web sections 23, and with its inner peripheral surface also engaged with the rollers 26. Moreover, the pins 18, which project from each side of the disc cam 10, project slidably into the registering slots 29 in the plates 21 and 22, thus limiting the relative angular movement which can be effected as between the disc cam 10 and the roll retainer 11.

As shown more clearly in FIGS. 2 and 3, the rollers 26 register with, and have rolling engagement at one diametral side thereof with the recesses 16 in the periphery of the cam plate 10, and at the diametrally opposite sides thereof with the inner peripheral surface of the ring gear 12. It will be noted also that each cam dwell 16 has at opposite ends thereof an inclined ramp section 16', where the dwell merges with the adjacent cam lobe 15, so that whenever one of the ramp sections 16' passes beneath a roll 26 the roll is urged radially outwardly against the inner peripheral surface of the gear 12 as noted hereinafter.

One manner in which a plurality of the above-described two-way roller clutches can be employed to produce a transmission in accordance with the teachings of this invention is illustrated generally and diagramatically in FIGS. 4 and 5. In these FIGS. 40 denotes a drive shaft which may be connected to and driven by a conventional engine, such as for example the internal combustion engine of an automotive vehicle or the like. Secured coaxially on shaft 40 in equi-axially spaced coaxial relation are eight different ring gears or drive gears, which are progressively larger in pitch diameter, and which are denoted by the numerals 41 through 48, respectively. Each of these drive gears is permanently engaged or meshed with one of eight, different driven gears 12-1 through 12-8, respectively, which are of progressively smaller pitch diameter and which are operationally similar to gear 12 in FIGS. 1–3, in that each of these gears forms part of a two-way roller clutch housing, including a retainer 11 of the type shown in FIGS. 1–3. These eight two-way roller clutches are mounted on a driven shaft 14, and as in the case of FIGS. 1–3, have the cams 10 thereof fixed to shaft 14.

Driven shaft 14 may be operationally connected by any conventional means to, for example, a pair of wheels W, such as for example the front or rear wheels of an automotive vehicle. Rotation of the driven shaft 14 will thus be imparted to the wheels W. Each of the driven gears 12-1 through 12-8 is mounted for rotation on one of eight roller retainers 11, which are similar in construction to the roller retainer 11 shown in FIGS. 1 to 3, and which are mounted for limited indexible rotation clockwise or counterclockwise about the axis of shaft 14.

Each of the driven gears 12-1 through 12-8 and its associated roller retainer 11 are mounted adjacent one of eight, stationary hydraulic control housings 51 through 58, respectively, which are operable selectively to index the associated roller retainer 11. Each of these housings 51 through 58 is similar in construction and operation, so only one such housing will be described in detail hereinafter.

Housing 58, for example, has formed thereon two, spaced, parallel arms 59, which flank opposite sides of gear 12-8 at the diametral side thereof remote from gear 48, and each of which arms has an arcuate-shaped inner end 60 (FIG. 5) which is disposed in spaced, confronting, coaxial relation to the vanes (such as vanes 32 in FIGS. 1 and 2) that are formed in the outer peripheral surfaces of each of the two annular plates 21 and 22 which make up the roller retainer 11. Each housing arm 59 has therein a pair of upper, spaced, fluid supply ducts which at one end (the right ends in FIG. 5) communicate with a supply S of fluid under pressure, and which open at their opposite ends (the left ends in FIG. 5) on the vaned, outer peripheral surface of one of the two plates (21 and 22) making up the associated retainer 11. Each arm 59 also contains a lower pair of spaced, fluid supply ducts 63 and 64 which open at one end (the right ends in FIG. 5) on the supply S of fluid under pressure, and which open at their opposite ends on the same, vaned outer peripheral surface of the retainer 11 as the ducts 61 and 62.

However, as will be apparent from an examination of FIG. 5, the fluid discharged by the upper ducts 61 and 62 against the vaned surface of retainer 11 are directed tangentially against the retainer in such manner as to tend to cause the retainer 11 to rotate in a counterclockwise direction, while the fluid emanating from the lower pair of ducts 63 and 64 strikes the same, vaned surface tangentially, but in a direction which tends to cause the retainer 68 to rotate in a clockwise direction. Thus, by selectively controlling the admission of fluid under pressure either to the ducts 61 and 62, or to the ducts 63 and 64 of the two arms 59 of housing 58, the associated retainer 11 can be caused to rotate slightly in either a counterclockwise or clockwise direction about the axis of shaft 14, and relative to the associated disc cam 10 to the extent permitted by the stop pins 18 on the cam, and the slots 29 in the surrounding retainer plates 21 and 22.

Referring now to FIGS. 2 and 3, when fluid from the supply S causes a retainer 11 to be rotated slightly counterclockwise relative to the cam 10 on shaft 14, the rolls or rollers 26 are urged slightly counterclockwise into positions such as shown in FIG. 2, and in which they have rolled up the inclined ramp 16' located at the extreme counterclockwise end of a dwell or recess 16 in the underlying cam surface. At this time the pins 18 on the cam will have been shifted to the extreme clockwise ends of the slots 29 in the associated retainer plates 21 and 22. In these positions the springs 25 to the right of the rollers 26, as shown for example in FIG. 2, will be slightly compressed, and will tend to maintain the rollers 26 resiliently in these first limit positions wherein any counterclockwise rotation of the gear 12 will cause the same rotation to be transmitted through the rollers 26 to the underlying cam disc 10, and hence to shaft 14. However, any clockwise rotation imparted to the gear 12 will cause the underlying rollers or rolls 26 to rotate or roll slightly in a clockwise direction, or down off of the ramp 16' at the left end (FIG. 2) of a cam dwell, thus disengaging the drive between the cam 10 and gear 12, so that the gear 12 is allowed to rotate freely in a clockwise direction relative to both the cam 10 and the shaft 14. In other words, even though at this time the retainer 11 is still being maintained in its extreme counterclockwise position relative to cam 10, gear 12 is allowed nevertheless to rotate freely in a clockwise direction, but not in a counterclockwise direction.

Referring to FIG. 3, when the retainer 11 is rotated to an extreme clockwise position relative to cam 10, the rollers 26 are then caused to rotate to the right ends of the dwells or cam recesses 16, thereby causing them to roll up on the ramp sections 16' located at the right ends of the recesses 16 as shown in FIG. 3. At such time, of course, the limit pins 18 also are engaged with the extreme counterclockwise ends of the slots 29 in the retainer plates 21 and 22. With the rollers 26 maintained in these positions, any clockwise rotation of the gear 12 will be imparted through the rollers 26 to the underlying cam disc 10, and consequently to shaft 14, which therefore also will be rotated in a clockwise direction. Conversely, when the gear 12 is rotated in the opposite or counterclockwise direction, it will rotate freely relative to the cam 10 and shaft 14.

As used herein, it is to be understood that the term "free wheeling" describes the situation in which a gear which forms part of a two-way roller clutch, of the type disclosed herein, is spinning slower than the shaft on which it is mounted, for example clockwise at 400 r.p.m. about the axis of shaft 14, while the latter is also spinning clockwise but at a greater speed (e.g. 500 r.p.m.). Under those circumstances the free-wheeling gear is not driving shaft 14 clockwise, and shaft 14 is in fact rotating slightly relative to the free-wheeling gear.

To describe the operation of a vehicle having a transmission of the type shown in FIGS. 4 and 5 it will be assumed that the engine of the vehicle rotates the drive shaft 40 in a counterclockwise direction about its axis, thereby tending to impart clockwise rotation to the gears on shaft 14. At the outset it will be assumed that the retainers 11 on shaft 14 have been rotatably indexed by their associated hydraulic mechanisms 51-59 into their counterclockwise positions, as represented for example by the mechanism shown in FIG. 2. In this position each of gears 12-1 through 12-8 will be in a free-wheeling position in a clockwise direction, so that as soon as the drive shaft 40 begins to rotate, and thus begins to rotate the drive gears 41 through 48, all of the driven gears 12-1 through 12-8 will be free-wheeling in a clockwise direction about shaft 14. At this time, therefore, shaft 14 remains stationary.

To commence operation of the vehicle in a forward direction, and assuming that the speed of shaft 40 is accelerated from a low to a high speed, the hydraulic system supplies fluid under pressure through the ports 63 and 64 in the first mechanism 51, thus causing the retainer 11 associated with gear 12-1 to be rotatably indexed clockwise into a position similar to that shown in FIG. 3. As soon as this happens the rotation of gear 41, which is then rotating gear 12-1 clockwise, is imparted to shaft 14, which begins to rotate very slowly in view of the ratio between the root diameters of gears 41 and 12-1 respectively.

In practice, the hydraulic control system is made to respond to the speed of rotation of the drive shaft 40, so that as the drive shaft 40 accelerates to its next stage, the second mechanism 52 causes fluid under pressure to be applied through its ducts 63 and 64 to the retainer 11 associated with the next gear 12-2 in the series thereof, thus causing this particular retainer to be indexed clockwise into a position such as that shown in FIG. 3. Consequently, the clockwise rotation imparted to gear 12-2 by the associated drive gear 42 is now imparted through its associated cam disc 10 to the shaft 14, thus increasing the speed of rotation of the shaft 14 in proportion to the ratio of the root diameter of gear 42 to that of gear 12-2. This increase in the speed of shaft 14 will cause the first gear 12-1 in the series thereof to become drivingly disengaged relative to the shaft 14, so that gear 12-1 now is free to rotate or free-wheel clockwise about the shaft 14. In other words, as gear 12-2 takes over and becomes drivingly engaged with shaft 14, it is rotating faster than gear 12-1. This causes a slight drag to be imparted to the gear 12-1, so that in effect it causes the associated rolls 26 to back down off the ramps 16' and toward the roll positions shown in FIG. 2, and at least far enough to permit gear 12-1 to continue to rotate in a clockwise direction, but at a speed slightly slower than that of shaft 14.

When the speed of the drive shaft 40 increases further, or to the next stage, the hydraulic mechanism indexes the retainer 11, which is associated with gear 12-3, slightly clockwise into a position such as shown in FIG. 3, whereby gear 12-3 becomes drivingly engaged with shaft 14, thereby increasing the rotation of this shaft to an extent depending upon the ratio between drive gear 43 and driven gear 12-3. About the same time, the increase in the speed of rotation of shaft 14 causes gear 12-2 to become drivingly disengaged relative to shaft 14, so that it also begins to rotate freely in a clockwise direction about shaft 14.

As the speed of shaft 40 increases further toward a maximum RPM, the successive mechanisms 54 through 58 drivingly engage, successively, gears 12-4 through 12-8 in a manner similar to that described above. Once in high gear (i.e. gear 12-8 drivingly engaged with shaft 14), all the retainers 11 of gears 12-1 through 12-8 will have been indexed into their clockwise positions (FIG. 3), and all of gears 12-1 through 12-7 will be free-wheeling in a clockwise direction around shaft 14.

Whenever the vehicle slows down, as for example because the accelerator pedal is released, or the brake pedal is depressed, the driven gear that was last in a driving mode relative to shaft 14, for example gear 12-8, will immediately begin to free-wheel clockwise on shaft 14 along with all the previously released gears 12-1 through 12-7. Alternatively, if it is desired to utilize the gear transmission for braking purposes, the hydraulic mechanisms 51–58 can be utilized to furnish engine braking through all gears in the train.

For example, assuming that the vehicle commences to slow down at a time when gear 12-8 is driving shaft 14, the mechanism 58 will cause the retainer 11 of gear 12-8 to be indexed counterclockwise to a position such as shown in FIG. 2. This causes gear 12-8, which is now being slowed down by gear 48, to become drivingly engaged with shaft 14 in such manner as to impart thereto a counterclockwise braking torque. As shaft 40 continues to slow down, the remaining housings 57–51 will cause successive counterclockwise indexing of the retainers for gears 12-7 through 12-1 until the vehicle is brought to an approximate stop, at which time all of the retainers 11 will have been indexed into their counterclockwise positions (FIG. 2), and will be ready once again for an acceleration sequence.

Obviously, of course, if the vehicle slows only slightly, only some of gears 12-1 through 12-8 need be indexed counterclockwise for braking purposes. Also, instead of engine braking in all of the gears down through the train, it is possible as with most present day automatic transmissions to use the high gear only in braking.

Among the advantages of this invention are the significant gas savings with a constant engine speed during acceleration, and no time interval between shifts; positive lock-up in all gears during acceleration and deceleration; a safer vehicle to drive, as engine braking may be used in all gears when decelerating; and simplicity of design and manufacture, as the identical two-way roller clutch should be used in all driven gears. Once a hydraulic shift mechanism has been designed and tested on one retainer, it can be duplicated throughout the gear train. The same basic unit, except for controls may be used for either automatic or standard shift. The design is not limited as to the horsepower it will transmit. A large flywheel effect is achieved with very little energy consumed by indexing the roller clutches. Up-shift and down-shift will be imperceptible as the driven shaft will be locked on the next gear in sequence before the previous gear is released. In other words, there will be no time during acceleration and deceleration that the driven shaft will not be torque-loaded. Because there is no slippage no heat will be generated with severe use. Heat is energy and therefore less power is used to operate this transmission than today's automatic transmissions. On four wheel drive vehicles this transmission will eliminate the need for a transfer case as the driven shaft may transmit power at each end.

From the foregoing it will be apparent that the present invention provides a very simple and economic means of transmitting power from a drive to a driven shaft. The improved two-way roller clutch disclosed herein may be made in standard sizes despite the diameters of the driven gears mounted thereon, and allows use of the gear train 12-1 through 12-8 for both acceleration and deceleration sequences. While only eight driven gears have been shown in FIG. 4, it will be apparent to one skilled in the art that the number and sizes of such gears can be varied as desired. Also, of course, the means for indexing the retainers 11 may be altered without departing from this invention; and of course the clutches and transmission disclosed herein obviously may be used for purposes other than driving a vehicle.

Although the above-noted transmission has been described only in connection with the motion of a vehicle in its forward direction, it will be understood that for reverse drive a jack shaft of conventional design would be interposed between shafts 40 and 14, and would be selectively engaged by a conventional mechanism forming no part of this invention. When shaft 14 is driven by the jack shaft in a counterclockwise direction, all of the retainers 11 for gears 12-1 through 12-8 will, of course, be indexed by their associated hydraulic mechanisms toward their clockwise positions (FIG. 3) so that they will not be drivingly engaged with shaft 14.

While this invention has been illustrated and described in connection with only certain embodiments thereof, it will be apparent that it is capable of still further modification, and that this application is intended to cover any such modifications as may fall within the scope of one skilled in the art or the appended claims.

I claim:

1. A variable speed transmission comprising:
   a first shaft having a first series of coaxially spaced gears mounted for rotation therewith;
   a second shaft having a second series of coaxially spaced gears in mesh with said first series of gears;
   said first and second series of gears defining respective gear pairs of progressively varying gear ratio for selectively transmitting power from one of said shafts to the other;
   a series of two-way roller clutches interposed between respective gear members of said second series of gears and said second shaft, said roller clutches being engageable for rotatively coupling said respective gear members to said second shaft and being disengageable for permitting relative rotation between said respective gear members and said second shaft;
   each of said roller clutches including a cam disk having a plurality of recesses formed in its peripheral surface and a roller retainer circumferentially supporting a plurality of rollers within respective recesses in said cam disk; and an externally controlled actuator connected to each of said retainers for indexing said roller retainers together with said plurality of rollers between respective limit positions within said recesses, one of said limit positions enabling engagement of said roller clutches in response to one direction of relative rotation between said respective gear members and said second shaft and the other of said limit positions enabling engagement of said roller clutches in response to an opposite direction of relative rotation between said respective gear members and said second shaft.

2. The variable speed transmission of claim 1 wherein said externally controlled actuator provides for successively indexing said roller retainers to said one limit position in response to acceleration of one of said shafts, each of said roller clutches being successively engaged at said one limit position in response to said one direction of relative rotation between the respective gear members and the second shaft, and each of said roller clutches being successively disengaged at said one limit position in response to said opposite direction of relative rotation between the respective gear members and the second shaft for selectively transmitting power from one of said shafts to the other through respective gear pairs of progressively varying gear ratio.

3. The variable speed transmission of claim 2 wherein said externally controlled actuator provides for successively indexing said roller retainers to said other limit position in response to deceleration of one of said shafts, each of said roller clutches being successively engaged at said other limit position in response to said opposite direction of relative rotation between the respective gear members and the second shaft and each of said roller clutches being successively disengaged at said other limit position in response to said one direction of relative rotation between the respective gear members and the second shaft for selectively transmitting power from one of said shaft to the other through respective gear pairs of progressively varying gear ratio.

4. The variable speed transmission of claim 3 wherein said plurality of rollers are circumferentially supported within said roller retainer by resilient means which permits said roller clutches to be successively disengaged in the same limit positions that each one of said roller clutches is successively engaged depending upon the direction of relative rotation between said respective gear members and said second shaft.

5. The variable speed transmission of claim 4 wherein said externally controlled actuator includes an annular plate rotatively coupled to said roller retainer, said annular plate having angularly spaced vanes in communication with a pair of fluid supply ducts of a stationary hydraulic control housing for delivering a supply of pressurized fluid against said angularly spaced vanes, one of said supply ducts providing for indexing said roller retainer to said one limit position and the other of said supply ducts providing for indexing said roller retainer to said other limit position.

6. The variable speed transmission of claim 3 wherein each of said cam disks are mounted for rotation with said second shaft and said plurality of rollers are circumferentially supported within said roller retainer by resilient means between said respective recesses in said cam disk and a peripheral surface of said respective gear members.

7. The variable speed transmission of claim 6 wherein said first shaft is connected for rotation with a vehicle's engine and said second shaft is connected for rotation with the vehicle's wheels.

8. A transmission for a motor vehicle comprising:
a drive shaft connected for rotation with a vehicle's engine having a series of drive gears of progressively larger pitch diameters mounted for rotation therewith;
a driven shaft mounted parallel to said drive shaft and connected for rotation with the vehicle's wheels having a series of driven gears mounted thereon in mesh with said series of drive gears;
two-way roller clutches interposed between each of said driven gears and said driven shaft, said roller clutches being engageable for rotatively coupling said driven gears to said driven shaft and being disengageable for permitting relative rotation between said driven gears and said driven shaft;
each of said roller clutches including a cam disk mounted for rotation with said driven shaft and having a plurality of recesses formed in its peripheral surface, and a roller retainer circumferentially supporting a plurality of rollers between respective recesses in said cam disk and a peripheral surface of said driven gears; and
a hydraulically controlled actuating means connected to each of said retainers for indexing said roller retainers together with said plurality of rollers between respective limit positions within said recesses, said actuating means including an annular plate rotatively coupled to said roller retainer and having angularly spaced vanes in communication with a pair of fluid supply ducts of a stationary hydraulic control housing for delivering a supply of pressurized fluid against said angularly spaced vanes, one of said supply ducts providing for indexing said roller retainer to one of said limit positions and the other of said supply ducts providing for indexing said roller retainer to the other of said limit positions.

9. The transmission of claim 8 wherein said one limit position enables engagement of said roller clutches in response to one direction of relative rotation between said driven gears and said driven shaft and said other limit position enables engagement of said roller clutches in response to an opposite direction of relative rotation between said driven gears and said driven shaft.

10. The transmission of claim 9 wherein said plurality of rollers are circumferentially supported within said roller retainer by resilient means which permits said roller clutches to be disengaged in the same limit positions that each one of said roller clutches is engaged depending upon the direction of relative rotation between said driven gears and said driven shaft.

* * * * *